United States Patent [19]

Goldman

[11] Patent Number: 5,447,741
[45] Date of Patent: Sep. 5, 1995

[54] MILK COMPOSITION CONTAINING FIBER AND METHOD FOR MAKING SAME

[76] Inventor: Marc S. Goldman, 60 Fairview Ave., Woodcliff Lake, N.J. 07675

[21] Appl. No.: 223,042

[22] Filed: Apr. 5, 1994

[51] Int. Cl.$^6$ .......................... A23C 9/154; A23C 9/20
[52] U.S. Cl. ...................................... 426/580; 426/72; 426/74; 426/573
[58] Field of Search .................... 426/580, 573, 72, 74

[56] References Cited

U.S. PATENT DOCUMENTS

| | | |
|---|---|---|
| 2,761,780 | 2/1952 | Stewart . |
| 3,025,164 | 7/1959 | Metzger . |
| 3,298,838 | 5/1963 | Villarreal . |
| 3,558,323 | 1/1971 | Cannalonga et al. ............... 426/580 |
| 4,219,583 | 8/1980 | Igoe ..................... 426/580 |
| 4,232,054 | 11/1980 | Durlach . |
| 4,389,425 | 6/1981 | Burr, II . |
| 4,701,329 | 10/1987 | Nelson et al. ........................ 426/580 |
| 4,797,289 | 3/1987 | Reddy . |
| 4,961,934 | 2/1989 | Iwasaki . |
| 5,066,500 | 11/1991 | Gil et al. ................................ 426/72 |
| 5,114,729 | 10/1989 | D'Aprigny . |
| 5,229,136 | 7/1993 | Mark et al. ............................. 426/72 |
| 5,234,704 | 10/1991 | Devine . |
| 5,260,279 | 5/1992 | Greenberg . |

FOREIGN PATENT DOCUMENTS 175886 7/1987 Japan .

OTHER PUBLICATIONS

Food Applications of Sunfiber.

*Primary Examiner*—Helen Pratt
*Attorney, Agent, or Firm*—Cushman Darby & Cushman

[57] ABSTRACT

The present invention relates to a milk composition containing milk and soluble dietary fiber prepared from guar gum which has been enzymatically hydrolyzed, wherein the milk composition has a low viscosity (for instance, not greater than about 50 cp.), and methods for making same. The milk composition may also contain non-fat milk solids and/or vitamins and minerals.

53 Claims, No Drawings

MILK COMPOSITION CONTAINING FIBER AND METHOD FOR MAKING SAME

FIELD OF THE INVENTION

The present invention relates to a milk beverage that contains fiber. More particularly, the present invention relates to a milk composition that contains fiber prepared from guar gum which has been enzymatically hydrolyzed, where the milk composition has a low viscosity.

BACKGROUND OF THE INVENTION

Because of the dietary need for both fiber and milk, it would be advantageous if a milk product existed that contained fiber. Heretofore, however, it was not feasible to produce a milk product that contained fiber in any nutritionally beneficial amounts. Whereas the daily dietary requirements of fiber for humans is high (for instance, the Food and Drug Administration guidelines specify that the recommended daily intake of fiber should be about 25 grams per adult), the amount of fiber that will stay in suspension with milk is conventionally quite low. Attempts to produce a milk product containing a nutritional amount of dietary fiber resulted in most of the fiber precipitating out.

It would also be advantageous if a milk product existed that contained nutritive amounts of both fiber and vitamins and minerals. However, vitamins and minerals often impart an undesirable taste to milk.

The present invention resolves these difficulties in that it provides a milk product that contains nutritionally beneficial amounts of fiber in solution with the milk. The invention also provides a milk product that contains nutritional amounts of both fiber and vitamins and minerals, without jeopardizing the integrity or taste of the milk.

SUMMARY OF THE INVENTION

It is an object of the present invention to provide a milk beverage that contains dietary fiber in nutritional amounts, while retaining a low viscosity in the character of the milk beverage.

The present invention relates to a milk composition comprising milk and soluble dietary fiber prepared from guar gum which has been enzymatically hydrolyzed, wherein the milk composition has a low viscosity (for instance, not greater than about 50 cp.). The milk may include, for instance, skim milk, ½% low-fat milk, 1% low-fat milk, 2% low-fat milk, whole milk, lactose-reduced milk, cholesterol-reduced milk and cultured milk. Preferably, the fiber stays in solution with the milk and does not settle out.

In another embodiment, the present invention relates to a milk composition comprising soluble dietary fiber, such as the composition described above, which further comprises non-fat milk solids.

In a further embodiment, the present invention relates to a milk composition comprising soluble dietary fiber, such as the composition described above, which further comprises vitamins and minerals. For instance, the composition may include vitamins such as vitamins A, $B_6$, $B_{12}$, C, D, E, niacin, folic acid, biotin, pantothenic acid, and may include minerals such as zinc.

The invention also contemplates a milk composition comprising soluble dietary fiber, such as the composition described above, which further comprises both non-fat milk solids and vitamins and minerals.

In addition, the present invention relates to a method of making a milk composition having a low viscosity (for instance, not greater than about 50 cp), which method comprises the step of mixing together milk and soluble dietary fiber prepared from guar gum which has been enzymatically hydrolyzed. cp.). The milk may include, for instance, skim milk, ½% low-fat milk, 1% low-fat milk, 2% low-fat milk, whole milk, lactose-reduced milk, cholesterol-reduced milk and cultured milk.

The method may further comprise the step of adding non-fat milk solids, and/or the step of adding vitamins and minerals. In addition, the method may further comprise the steps of pasteurizing or ultrapasteurizing.

DETAILED DESCRIPTION OF THE INVENTION

It has been found that adding certain soluble dietary fiber to milk can provide a beverage that significantly supplements nutritional dietary fiber intake, while retaining a low viscosity of the finished milk product. Specifically, the finished milk product has a viscosity not greater than 50 cp, and preferably less than 25 cp. Even more preferably, the viscosity of the milk product is about 10 cp.

The fiber contemplated by the invention is prepared from guar gum which has been enzymatically hydrolyzed. In particular, the hydrolyzed guar gum is commercially available from Sandoz Nutrition Corp. (Minneapolis, Minn.) under the trade name Benefiber. It is also commercially available from Taiyo Kagaku Co., Ltd. (Japan) under the trade name SunFiber.

The guar gum is hydrolyzed by the enzyme $\beta$-mannase from *Aspergillus niger*. After hydrolysis, the guar gum may be refined by activated carbon, sterilized and spray-dried. Prior to hydrolysis, the molecular weight of guar gum is approximately 200,000. Following hydrolysis, the molecular weight is 20,000 to 30,000. However, for use in this invention the molecular weight may vary, as long as the viscosity of the finished milk product does not exceed 50 cp.

Preferably, the soluble dietary fiber remains in solution with the milk, and does not settle out. To that end, the milk composition preferably comprises milk and up to 0.0123 weight percent soluble dietary fiber.

The term "milk" as contemplated by the invention is intended to include all types of milk and milk products, such as for instance, skim milk, ½% low-fat milk, 1% low-fat milk, 2% low-fat milk, whole milk, lactose-reduced milk, cholesterol-reduced milk and cultured milk, or mixtures thereof. Preferably, the milk is from a cow.

Optionally, the milk composition may further comprise natural or artificial flavoring. Examples of flavoring include chocolate, strawberry, vanilla, coffee, banana or peanut butter flavoring.

In another embodiment of the invention, the milk composition may further comprise non-fat milk solids. It is advantageous to fortify milk with non-fat milk solids to improve the taste and texture of the finished product. The term "non-fat milk solids" in connection with this invention is well known in the art, and denotes a combination of protein, carbohydrates, minerals and vitamins, such as would be obtained from dried or dehydrated skim milk or condensed skim milk. If the milk is skim milk, it is preferable that the non-fat milk solids comprise 3% by weight of the skim milk. If the milk is ½% low-fat milk, it is preferable that the non-fat milk solids comprise 3% by weight of the ½% low-fat milk. If the milk is 1% low-fat milk, it is preferable that the non-fat milk solids comprise 2% by weight of the 1% low-fat milk. If the milk is 2% low-fat milk, it is preferable that the non-fat milk solids comprise 1.5% by weight of the 2% low-fat milk. If the milk is whole milk, it is preferable that the non-fat milk solids comprise 1.5% by weight of the whole milk.

In a further embodiment, the milk composition may further comprise at least one vitamin and at least one mineral. Preferably, the vitamins include vitamins A, $B_6$, $B_{12}$, C, D, E, niacin, folic acid, biotin and/or pantothenic acid. Preferably, the mineral includes zinc. For example, a preferable embodiment would be where vitamin A comprises 0.0909% weight percent of the milk composition, vitamin $B_6$ comprises 0.0069% weight percent of the milk composition, vitamin $B_{12}$ comprises 0.0164% weight percent of the milk composition, vitamin C comprises 0.3055% weight percent of the milk composition, vitamin D comprises 0.0114% weight percent of the milk composition, vitamin E comprises 0.1637% weight percent of the milk composition, niacin comprises 0.05% weight percent of the milk composition, folic acid comprises 0.0011% weight percent of the milk composition, biotin comprises 0.075% weight percent of the milk composition, pantothenic acid comprises 0.0297% weight percent of the milk composition, and zinc comprises 0.0447% weight percent of the milk composition.

In another embodiment, the milk composition further comprises both the non-fat milk solids, as discussed hereinabove, and at least one vitamin and at least one mineral, as discussed hereinabove.

In a further embodiment, the present invention relates to a method of making a milk composition having a viscosity not greater than about 50 cp, which method comprises the step of mixing together milk and soluble dietary fiber prepared from guar gum which has been enzymatically hydrolyzed. Preferably, the finished milk product has a viscosity preferably less than 25 cp. Even more preferably, the viscosity of the milk product is about 10 cp.

As discussed hereinabove, it is preferable that the soluble dietary fiber remains in solution with the milk. For instance, it is preferable that the soluble dietary fiber comprises about 0.0123 weight percent of the milk composition.

Optionally, the method may further comprise the step (or steps) of homogenizing, pasteurizing and/or ultrapasteurizing the milk, either before the soluble dietary fiber is added or after.

Further, the method may further comprise the step of adding flavoring, either before the soluble dietary fiber is added or after. Examples of flavoring include chocolate, strawberry, vanilla, coffee, banana or peanut butter flavoring.

Additionally, the method may further comprise the step of adding non-fat milk solids, either before the soluble dietary fiber is added or after. If the milk is skim milk, it is preferable that the non-fat milk solids comprise 3% by weight of the skim milk. If the milk is ½% low-fat milk, it is preferable that the non-fat milk solids comprise 3% by weight of the ½% low-fat milk. If the milk is 1% low-fat milk, it is preferable that the non-fat milk solids comprise 2% by weight of the 1% low-fat milk. If the milk is 2% low-fat milk, it is preferable that the non-fat milk solids comprise 1.5% by weight of the 2% low-fat milk. If the milk is whole milk, it is preferable that the non-fat milk solids comprise 1.5% by weight of the whole milk.

Further, the method may further comprise the step of adding at least one vitamin and at least one mineral, either before the soluble dietary fiber is added or after. Preferably, the vitamins include vitamins A, $B_6$, $B_{12}$, C, D, E, niacin, folic acid, biotin and/or pantothenic acid. Preferably, the mineral includes zinc. For example, a preferable embodiment would be where vitamin A comprises 0.0909% weight percent of the milk composition, vitamin $B_6$ comprises 0.0069% weight percent of the milk composition, vitamin $B_{12}$ comprises 0.0164% weight percent of the milk composition, vitamin C comprises 0.3055% weight percent of the milk composition, vitamin D comprises 0.0114% weight percent of the milk composition, vitamin E comprises 0.1637% weight percent of the milk composition, niacin comprises 0.05% weight percent of the milk composition, folic acid comprises 0.0011% weight percent of the milk composition, biotin comprises 0.075% weight percent of the milk composition, pantothenic acid comprises 0.0297% weight percent of the milk composition, and zinc comprises 0.0447% weight percent of the milk composition.

In another embodiment, the present invention relates to a method of making a milk composition having a viscosity not greater than about 50 cp (preferably less than 25 cp. and most preferably about 10 cp), which method comprises the steps of:
(i) mixing together milk and at least one vitamin and at least one mineral;
(ii) mixing non-fat milk solids with the result of step (i);
(iii) mixing soluble dietary fiber with the result of step (ii), which fiber is prepared from guar gum which has been enzymatically hydrolyzed, to form a milk composition having a viscosity not greater than about 50 cp. The specific order of mixing the components of steps (i), (ii) and (iii) (i.e., the fiber, vitamins and minerals, and non-fat milk solids) into the milk is not critical to practicing the invention. For instance, the non-fat milk solids may first be mixed with milk, then the soluble dietary fiber may be added, and lastly the at least one vitamin and at least one mineral may be added, as long as the resulting milk composition has a viscosity not greater than about 50 cp.

It is preferable that the at least one vitamin, the at least one mineral, the non-fat milk solids and the soluble dietary fiber remain in solution with the milk.

The invention is further described in the following non-limiting examples, which are set forth for illustrative purposes only.

EXAMPLE 1

Dietary fiber prepared from guar gum which has been enzymatically hydrolyzed (called Benefiber) was obtained from Sandoz Nutrition. The fiber was thoroughly mixed into 2% milk until the fiber went into solution with the milk. The amount of fiber added was the equivalent 3 grams of fiber per 8 ounces (240 ml) of milk, as this was determined to be the highest level of dietary fiber that could be added to the milk without jeopardizing the integrity of the final milk products. As determined by experiments, this combination gave the best texture and smoothest mouth feeling, without settling at the bottom or leaving any aftertaste. Also, it provided about 10% of the recommended daily intake (RDI) per 8 ounce serving (according to FDA guidelines).

This milk composition was successfully prepared on plant scale using 500 gallons of 2% low-fat milk.

EXAMPLE 2

A number of experiments were conducted to meet the objective of fortifying milk products with fiber and vitamins and minerals at the highest possible level, without jeopardizing the integrity of these products.

A plant run was done where a premix of vitamins and minerals in the amounts indicated in Table A were added to 2% low-fat milk (use rate 110 mg premix/8 ounce milk). (The milk was first standardized.) The premix was added and mixed for 20 minutes. It was then pasteurized and homogenized on H.T.S.T. #2 ("High Temperature, Short Time") at 170° F. for 15 seconds, and cooled to 40° F.

The resulting milk product contained vitamins and minerals providing 25% of the U.S.R.D.I. per 8 ounces of milk product. It had a normal color, no aftertaste, and in blind taste tests, no one could tell the difference from 2% milk that was not fortified.

Dietary fiber (as described above) may then be mixed into the milk product (3 grams of fiber per 8 ounces of milk). The resulting milk product will contain dietary fiber providing about 10% of the recommended daily intake (RDI) per 8 ounce serving.

EXAMPLE 3

A number of experiments were conducted to meet the objective of fortifying milk products with fiber and non-fat milk solids at the highest possible level, without jeopardizing the integrity of these products.

A plant run was done where skim milk, 1% low-fat milk, 2% low-fat milk, and 3.25% (whole) milk were fortified with non-fat milk solids to improve the taste and the texture of the milk.

The experiments were done first in the lab to determine the right level of non-fat milk solids to be added. The best result was to add 3% non-fat milk solids to the skim milk, 2% non-fat milk solids to the low-fat 1% milk, and 1.5% non-fat milk solids to the low-fat 2% milk and 3.25% milk.

The plant scaled experiments were done by standardizing the percent butterfat of the milk, adding the non-fat milk solids mix for 20 minutes, testing the B.F. % (butter fat) and T.S. % (total solid), pasteurizing and homogenizing the products on H.T.S.T. #2.

The taste of the finished products was very good, with good mouth feeling and texture on all the products. The resulting product also have 35% more calcium than the RDI and 38% more protein.

Dietary fiber (as described above) may then be mixed into the milk product (3 grams of fiber per 8 ounces of milk). The resulting milk product will contain dietary fiber providing about 10% of the recommended daily intake (RDI) per 8 ounce serving.

EXAMPLE 4

Experiments were conducted to meet the objective of fortifying milk products with fiber, vitamins and minerals, and non-fat milk solids at the highest possible level, without jeopardizing the integrity of these products.

The plant experiments were done as indicated in the Examples above, with the vitamin and the mineral premix of Table A being added with non-fat milk solids to 2% milk and the products were mixed, pasteurized and homogenized as before. The finished product was very good, with good mouth feeling, no aftertaste, and nice color.

Fiber was then added to the products that were already fortified with non-fat milk solids and vitamin/mineral premix (3 grams of fiber per 8 ounces of product).

The experiments were done on plant scale using 500 gallons of 2% low-fat milk. The finished product was very good.

EXAMPLE 5

Further experiments were conducted on a plant scale, using 500 gallons of skim milk/1% low-fat milk/2% low-fat milk, and 3.25 B.F. milk fortified with the non-fat milk solids, the vitamin and mineral premix and the fiber. The resulting milk products were excellent, with no settling out or leaving any aftertaste of any of the fiber, vitamins, minerals or non-fat milk solids.

Although the vitamin and mineral premix and the fiber could be added after the product is pasteurized, it is preferable to add them before the pasteurization to prevent any contamination. These products could also be ultra-pasteurized at 280° F. for 2 seconds.

I claim:

1. A milk composition comprising milk and up to about 0.0123 weight percent soluble dietary fiber prepared from guar gum which has been enzymatically hydrolyzed, wherein the milk composition has a viscosity not greater than about 50 cp.

2. The milk composition according to claim 1, wherein the viscosity is less than 25 cp.

3. The milk composition according to claim 1, wherein the viscosity is about 10 cp.

4. The milk composition according to claim 1, wherein the soluble dietary fiber remains in solution with the milk.

5. The milk composition according to claim 1, wherein the milk is selected from the group consisting of skim milk, ½% low-fat milk, 1% low-fat milk, 2% low-fat milk, whole milk, lactose-reduced milk, cholesterol-reduced milk and cultured milk.

6. The milk composition according to claim 1, which further comprises flavoring.

7. The milk composition according to claim 6, wherein the flavoring includes chocolate, strawberry, vanilla, coffee, banana or peanut butter flavoring.

8. The milk composition according to claim 1, which further comprises non-fat milk solids.

9. The milk composition according to claim 8, wherein the non-fat milk solids comprise dehydrated skim milk or condensed skim milk.

10. The milk composition according to claim 8, wherein the milk is skim milk and the non-fat milk solids comprise 3% by weight of the skim milk.

11. The milk composition according to claim 8, wherein the milk is ½% low-fat milk and the non-fat milk solids comprise 3% by weight of the ½% low-fat milk.

12. The milk composition according to claim 8, wherein the milk is 1% low-fat milk and the non-fat milk solids comprise 2% by weight of the 1% low-fat milk.

13. The milk composition according to claim 8, wherein the milk is 2% low-fat milk and the non-fat milk solids comprise 1.5% by weight of the 2% low-fat milk.

14. The milk composition according to claim 8, wherein the milk is whole milk and the non-fat milk solids comprise 1.5% by weight of the whole milk.

15. The milk composition according to claim 1, which further comprises at least one vitamin and at least one mineral.

16. The milk composition according to claim 15, wherein the vitamins are vitamins A, $B_6$, $B_{12}$, C, D, E, niacin, folic acid, biotin and pantothenic acid, and the mineral is zinc.

17. The milk composition according to claim 15, which further comprises non-fat milk solids.

18. The milk composition according to claim 17, wherein the non-fat milk solids comprise dehydrated skim milk or condensed skim milk.

19. The milk composition according to claim 17, wherein the milk is skim milk and the non-fat milk solids comprise 3% by weight of the skim milk.

20. The milk composition according to claim 17, wherein the milk is ½% low-fat milk and the non-fat milk solids comprise 3% by weight of the ½% low-fat milk.

21. The milk composition according to claim 17, wherein the milk is 1% low-fat milk and the non-fat milk solids comprise 2% by weight of the 1% low-fat milk.

22. The milk composition according to claim 17, wherein the milk is 2% low-fat milk and the non-fat milk solids comprise 1.5% by weight of the 2% low-fat milk.

23. The milk composition according to claim 17, wherein the milk is whole milk and the non-fat milk solids comprise 1.5% by weight of the whole milk.

24. A method of making a milk composition having a viscosity not greater than about 50 cp, which method comprises the step of mixing together milk and up to about 0.0123 weight percent soluble dietary fiber prepared from guar gum which has been enzymatically hydrolyzed.

25. The method according to claim 24, wherein the viscosity is less than 25 cp.

26. The method according to claim 24, wherein the viscosity is about 10 cp.

27. The method according to claim 24, wherein the soluble dietary fiber remains in solution with the milk.

28. The method according to claim 24, wherein the milk is selected from the group consisting of skim milk, ½% low-fat milk, 1% low-fat milk, 2% low-fat milk, whole milk, lactose-reduced milk, cholesterol-reduced milk and cultured milk.

29. The method according to claim 24, which further comprises the step of pasteurizing.

30. The method according to claim 24, which further comprises the step of ultra-pasteurizing.

31. The method according to claim 24, which further comprises the step of adding flavoring.

32. The method according to claim 31, wherein the flavoring includes chocolate, strawberry, vanilla, coffee, banana or peanut butter flavoring.

33. The method according to claim 24, which further comprises the step of adding non-fat milk solids.

34. The method according to claim 33, wherein the non-fat milk solids comprise dehydrated skim milk or condensed skim milk.

35. The method according to claim 33, wherein the milk is skim milk and the non-fat milk solids comprise 3% by weight of the skim milk.

36. The method according to claim 33, wherein the milk is ½% low-fat milk and the non-fat milk solids comprise 3% by weight of the ½% low-fat milk.

37. The method according to claim 33, wherein the milk is 1% low-fat milk and the non-fat milk solids comprise 2% by weight of the 1% low-fat milk.

38. The method according to claim 33, wherein the milk is 2% low-fat milk and the non-fat milk solids comprise 1.5% by weight of the 2% low-fat milk.

39. The method according to claim 33, wherein the milk is whole milk and the non-fat milk solids comprise 1.5% by weight of the whole milk.

40. The method according to claim 24, which further comprises the step of adding at least one vitamin and at least one mineral.

41. The method according to claim 40, wherein the vitamin is vitamins A, $B_6$, $B_{12}$, C, D, E, niacin, folic acid, biotin and pantothenic acid, and the mineral is zinc.

42. A method of making a milk composition having a viscosity not greater than about 50 cp, which method comprises the steps of:
(i) mixing together milk and at least one vitamin and at least one mineral;
(ii) mixing non-fat milk solids with the result of step (i);
(iii) mixing up to about 0.0123 weight percent soluble dietary fiber with the result of step (ii), which fiber is prepared from guar gum which has been enzymatically hydrolyzed, to form a milk composition having a viscosity not greater than about 50 cp.

43. The method according to claim 42, wherein the viscosity of the milk composition is less than 25 cp.

44. The method according to claim 42, wherein the viscosity of the milk composition is about 10 cp.

45. The method according to claim 42, wherein the at least one vitamin, the at least one mineral, the non-fat milk solids and the soluble dietary fiber remain in solution with the milk.

46. The method according to claim 42, which further comprises the step of pasteurizing the milk composition.

47. The method according to claim 42, wherein the milk is skim milk and the non-fat milk solids comprise 3% by weight of the skim milk.

48. The method according to claim 42, wherein the milk is ½% low-fat milk and the non-fat milk solids comprise 3% by weight of the ½% low-fat milk.

49. The method according to claim 42, wherein the milk is 1% low-fat milk and the non-fat milk solids comprise 2% by weight of the 1% low-fat milk.

50. The method according to claim 42, wherein the milk is 2% low-fat milk and the non-fat milk solids comprise 1.5% by weight of the 2% low-fat milk.

51. The method according to claim 42, wherein the milk is whole milk and the non-fat milk solids comprise 1.5% by weight of the whole milk.

52. The method according to claim 42, wherein the vitamin is vitamins A, $B_6$, $B_{12}$, C, D, E, niacin, folic acid, biotin and pantothenic acid, and the mineral is zinc.

53. The method according to claim 52, wherein
vitamin A comprises 0.0909% weight percent of the milk composition,
vitamin $B_6$ comprises 0.0069% weight percent of the milk composition, vitamin $B_{12}$ comprises 0.0164% weight percent of the milk composition, vitamin C comprises 0.3055% weight percent of the milk composition, vitamin D comprises 0.0114% weight percent of the milk composition, vitamin E comprises 0.1637% weight percent of the milk composition, niacin comprises 0.05% weight percent of the milk composition, folic acid comprises 0.0011% weight percent of the milk composition, biotin comprises 0.075% weight percent of the milk composition, pantothenic acid comprises 0.0297% weight percent of the milk composition, and zinc comprises 0.0447% weight percent of the milk composition.

* * * * *